United States Patent Office 3,236,960
Patented Feb. 22, 1966

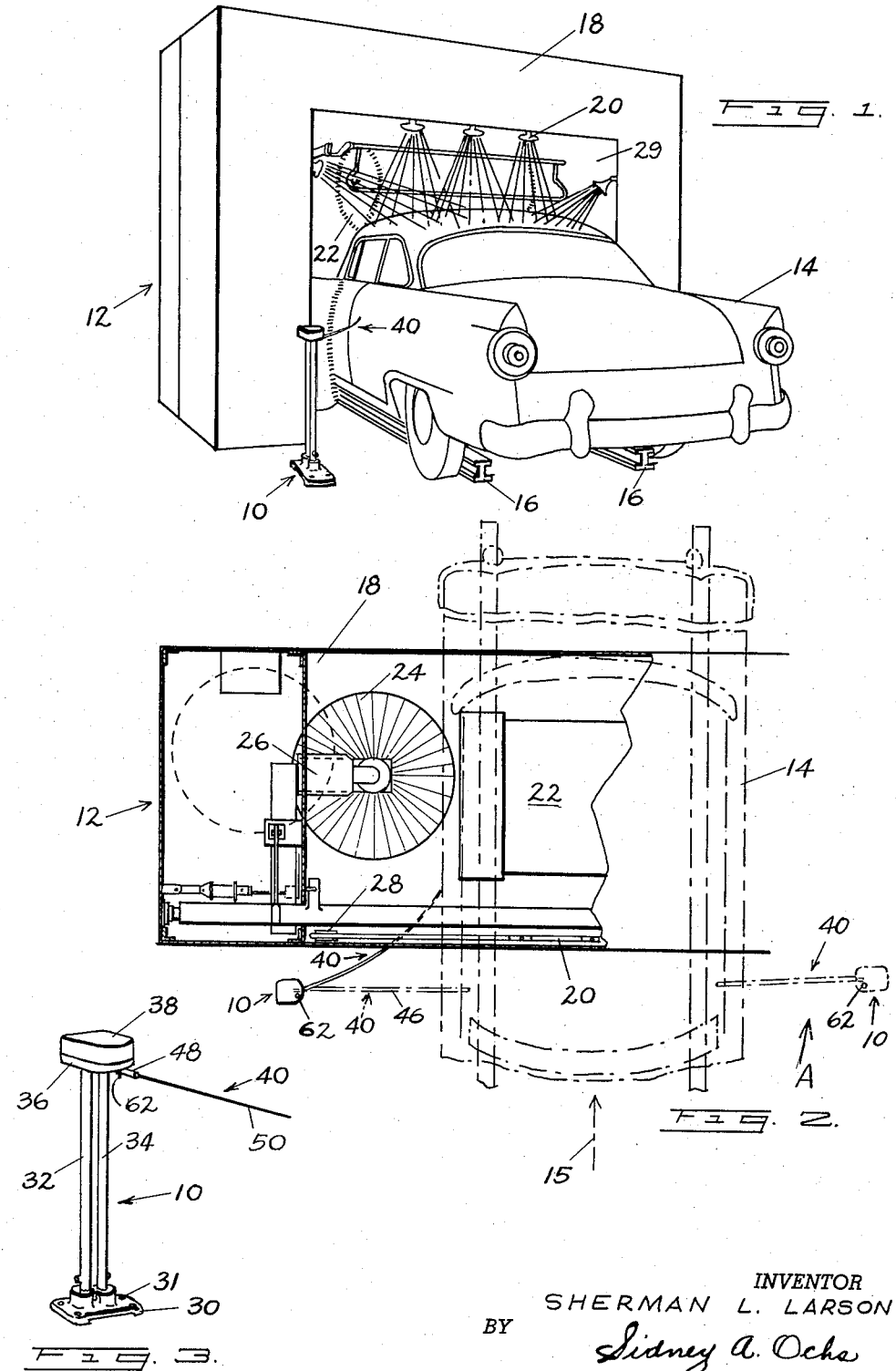

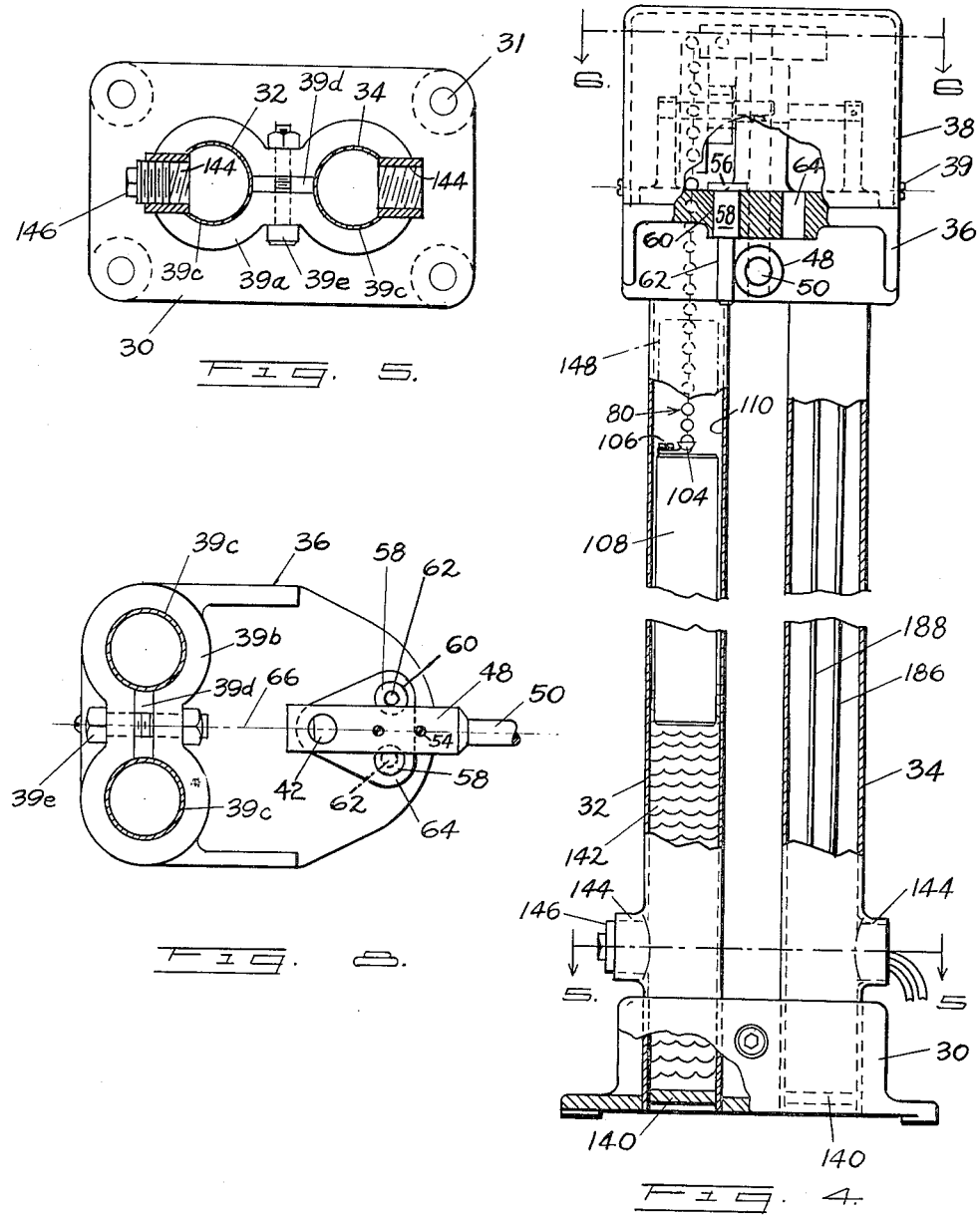

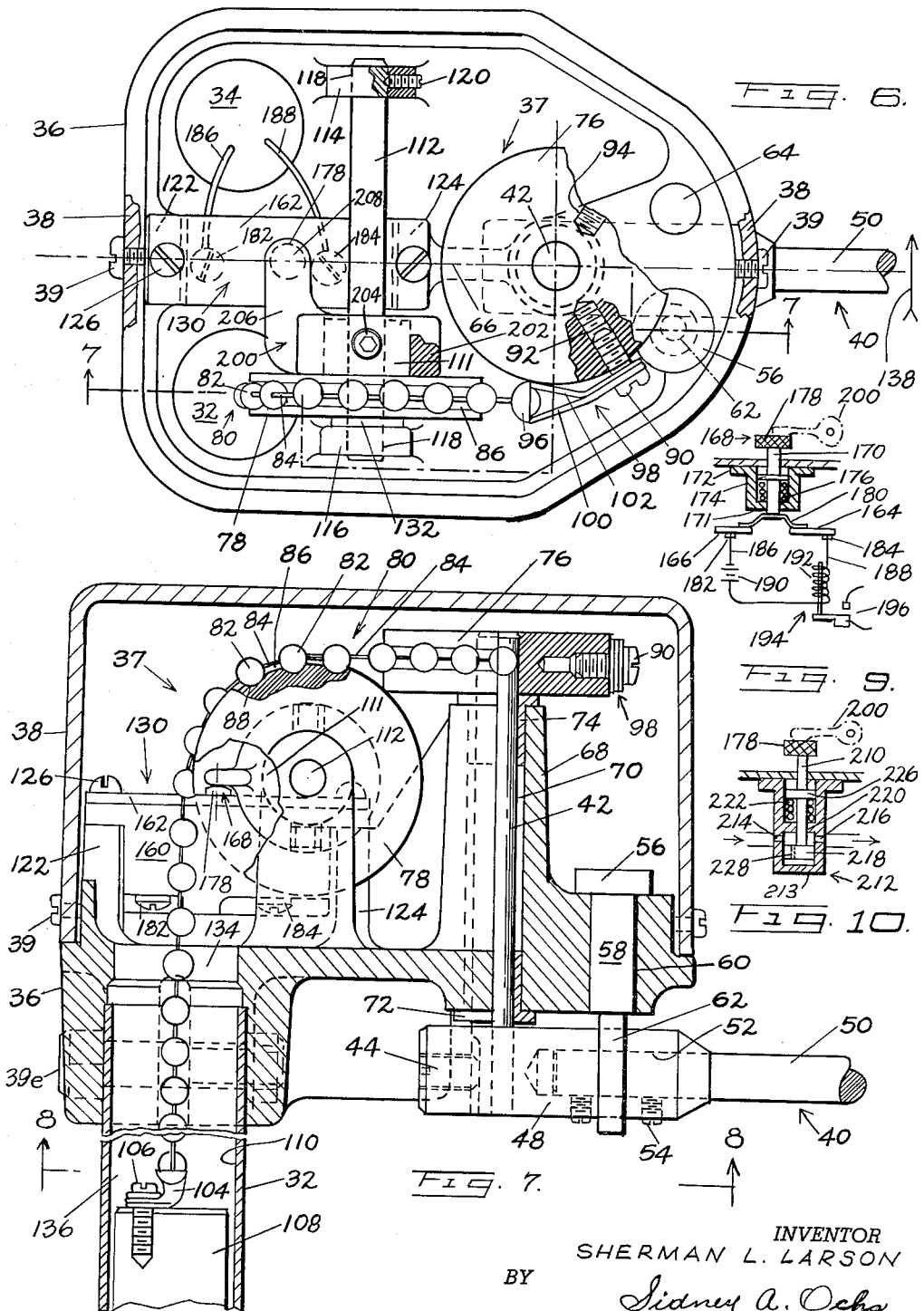

3,236,960
ACTUATOR MECHANISM FOR CAR WASH LINE CONTROLS
Sherman L. Larson, Palmyra, N.J., assignor to Sherman Car Wash Equipment Co., Palmyra, N.J., a corporation of New Jersey
Filed Aug. 31, 1962, Ser. No. 220,606
19 Claims. (Cl. 200—61.41)

This invention relates to an actuator mechanism for automatic car wash lines for controlling through the medium of the vehicle being treated, or manually, of the "on" and "off" functioning of one or more elements or units of a complete wash line for performing steps such as, rinsing, body brushing, detergent applying, air blasting of excess water, air drying, wheel scrubbing and the like. It especially concerns a vehicle operable limit switch or valve actuator device for the above purposes and the like, that is substantially positive and dependable in its action, that provides a wide range of control adjustment and which can be employed on either side of a car wash line and in either direction of motion of the line by mere rearrangement of several parts of the actuator mechanism.

Conventional actuator devices have heretofore taken the form of electronic means such as electric eyes or other light sensitive elements and mechanical elements such as overcenter spring devices employing spring return mechanisms. Electronic devices are costly and sensitive to surrounding light conditions and vehicle appurtenances. Overcenter spring mechanisms are not self-resetting and spring return actuators are subject to hunting, i.e. rebounding causing repetitive on-off operation of the mechanisms involved in the car wash operations and controlled thereby.

The present invention provides a unique mechanical actuator device free of the disadvantages of prior actuator means and which is smooth, positive and foolproof in operation. It requires no return springs or overcenter control and has universal application to all elements and units of a car wash line operation. It may be manually or mechanically operable as by an operator, a vehicle, or any other moving element of a car wash operation.

The principal object of the invention is to provide an actuator means or device operable upon a control means, which may also be part of said device, for controlling one or more elements, units or machines of a car wash line.

A further object is to provide a device as in the preceding object that is universal in application to either side of a car wash line and for either direction of motion of a car wash line.

Still another object is to provide a device as in the preceding objects wherein the control means comprises a switch or valve for performing the actual control function over the wash line units.

Another object is to provide a device as in the preceding objects that is free of spring return mechanisms and elements apt to cause hunting or other repeated functioning of the switch or valve it actuates.

A particular object is to provide a control device as in the preceding objects in which the inertia effect of the moving parts of the device are minimized by causing certain parts to operate in a liquid.

Another particular object is to provide a control or actuator device operable upon a control means for controlling selective functioning of one or more elements, units, or machines of a car wash line which device includes a swingable operating arm for effecting operation of said actuator device between selective conditions, the said arm having an axis fixed relative to the car wash line and being operable from a first to a second position by a vehicle moving along said line upon being intercepted by the latter, and being adapted for return to said first position upon overtravel of the vehicle past said arm, gravity acting means for returning said arm to said first position and dashpot means for inhibiting hunting of said actuator device by rebound action of said operating arm in returning to its said first position.

Another object is to provide in a motor vehicle wash line including one or more devices operable to perform predetermined treatments or operations upon a vehicle movable therethrough, a control means for controlling functioning of at least one of said devices and operating means for actuating said control means between a first and a second control condition including an actuating arm and a swingable operating arm drivingly connected with said actuating arm and operable by said vehicle for establishing said control means in said second control condition, said operating arm being releasably operable by said vehicle for facilitating an operation thereof and of said actuating arm, for effecting reestablishment of said control means in its said first control condition, weight means drivingly connected with said arms and operable thereon upon release of said operating arm by said vehicle for effecting reestablishment of said control means in said first control condition, and fluid means operable upon said weight means for inhibiting hunting of said control means.

Still another specific object is to provide a limit switch actuator mechanism including an elongated flexible operating arm releasably operable by a vehicle, a switch actuating arm drivingly connected with said operating arm and operable for actuating a switch means from a first to a second control condition, an actuating weight operable upon said switch actuating arm upon release of said operating arm by the vehicle for moving said switch actuating arm in a direction to restore said switch means to its said first control condition and for reversely operating said operating arm, and a fluid chamber for receiving said actuating weight and containing a fluid operable upon said actuating weight to inhibit inertia rebound of said actuating and operating arms upon release of the latter by the vehicle and to thereby inhibit hunting of said switch means between its control conditions.

Other objects and advantages of my invention will appear from the following description and claims and from the drawings showing an illustrative embodiment of the invention and mode of its application.

In the drawings wherein similar numerals designate corresponding parts of the structure;

FIGURE 1 shows the actuator device of my invention as applied to a car wash line immediately in front of and to the left of a rinse and body brushing unit and being operated upon by a vehicle passing through the same;

FIGURE 2 is a top view partly in section of a portion of the structure in FIGURE 1;

FIGURE 3 is a perspective view in elevation of the actuator device of my invention;

FIGURE 4 is a front elevational view, partly in section, showing the structure of the actuator device of my invention;

FIGURE 5 is a sectional plan view taken at 5—5 of FIGURE 4;

FIGURE 6 is a top plan view partly in section of the actuator device of my invention taken at 6—6 of FIGURE 4 with parts of the cover and other mechanism broken away;

FIGURE 7 is an elevational view partly in section taken at 7—7 of FIGURE 6;

FIGURE 8 is a plan view partly in section, of the actuator device of my invention looking in the direction of the arrow 8—8 in FIGURE 7, and showing in phantom the alternative position of the stop means;

FIGURE 9 is a schematic view of a portion of a switch control means that may be incorporated in the actuator device of my invention and shown in circuit with a relay for controlling the wash line unit; and FIGURE 10 is a schematic view of a portion of a hydraulically controlled means which may be used in place of the switch means of FIGURE 9.

Referring to FIGURES 1 to 9, these figures show my novel actuator device generally designated by the numeral 10, applied to the operation of a combined rinse and body brush unit 12, such as shown in my Patent No. 3,035,293, granted May 22, 1962, of an automatic car wash line through which a motor vehicle 14 is being moved in the direction of the arrow 15 by suitable means such as a conveyor chain pull (not shown) and guided by a rail type guideway 16. The unit 12 comprises an enclosure or housing 18 of inverted U shape which straddles the vehicle 14 and guide way 16—16 and houses among other elements a rinse unit 20, a swingable and rotatable top body brush 22 and a swingable and rotatable side body brushes 24 (one being shown). Drive means such as a motor 26 are provided for rotating the brushes and solenoid valve means 28 controls the admission of pressure fluid to the rinse means 20.

The function of the actuator device 10 in this arrangement is to control for example the solenoid valve 28 and the brush motor 26 aforesaid in such manner that each is energized at the substantial instant of entry of the vehicle 14 to the archway 29 of the housing 18 and to direct streams of liquid such as water against the body of the vehicle and cause the rotation of the body brushes 22, 24 for effectively brushing the wetted surface of the vehicle body.

As shown in FIGURES 1 to 8, the device 10 comprises a metallic pedestal-like structure including a foot 30 rigidly secured to the floor of the wash premises adjacent one side (the left side in FIGURE 1) of the housing 18 and rearwardly of the entrance side thereof, through holes 31 by bolts, not shown. The foot 30 supports column means comprising a pair of hollow columns or tubes 32, 34 which in turn carry a generally rectangular body member 36 supporting internal operating mechanism, to be described, generally referred to by the numeral 37 and enclosed by a deep cover 38 housing the same and secured to the body member 36 by clamp screws 39. The base 30 and body member 36 are provided respectively with upstanding and depending bosses 39a and 39b respectively of FIGURE 8 configuration providing a pair of suitable bores or sockets 39c in which the tubes 32, 34 are mounted.

Each pair of bores 39c are interconnected by slots 39d the depth of the bosses and extending across the bosses 39a and 39b at the slots are bolts 39e which spring the boss wall portions sufficiently to clamp the tubes 32, 34 tightly in their bores. Extending outwardly of the body 36 adjacent the under side thereof is an operating arm generally referred to by the numeral 40 for driving the mechanism 37 of which it is a part. It is suitably pivotally mounted on the body 36 through a vertical drive shaft 42 to which it is held as by set screws 44. The arm 40 may swing in a generally horizontal plane through a desired angle. For example, it may move from a position 46 indicated by the phantom showing in FIGURE 2 where it is intercepted by the vehicle 14 about to enter the archway of the housing 18, to the full line position in FIGURE 2 in which it is maintained by the vehicle 14 until the latter moves clear of the arm 40 after which the latter automatically returns to its original position in a manner to be described. An angle of about 70 degrees more or less will usually suffice for most installations. The arm 40 may be entirely rigid or may be composed of an inner rigid hub section 48 and an elongated, preferably flexible, antenna or feeler rod or stem 50 which will be acted upon by the vehicle and in turn act upon the mechanism 37. Ordinarily the stem will cam or slide over the car surface under a light pressure exerted by the return mechanism to be described. Thus as seen in FIGURE 1 the stem 50 lightly engages and rides over the left side of the vehicle body 14 there shown.

The stem 50 may be secured in a socket 52 of the hub section 48 as by set screws 54. The stem 50 may be made of any suitable material for example of metal, or rubber covered metal, but it is preferably made of fibre glass, in either case preferably having sufficient flexibility or resiliency such that if a forward limit stop is provided or if the vehicle should back up, the stem 50 will bend when the section 48 is against a stop member such as a stepped pin 56. The latter is rigidly secured to the body member 36 as by releasably pressing a portion 58 thereof in a hole or bore 60 of the body member. The pin 56 has a stem 62 projecting downwardly from the body 56 and into the arcuate path or sweep of the arm 40 to intercept the same. It will be observed that the body 36 is provided as seen in FIGURES 4, 6, and 8 with a second hole or bore 64, similar to the hole 60, on the opposite side of a median line 66, for receiving a stop pin 56 under circumstances to be hereinafter described.

The body member 36 is provided with an upstanding elongated cast boss 68 having a bore 70 through which the drive shaft 42 extends and in which it is journalled on opposite shouldered bearing inserts 72, 74 pressed into the bore 70. The upper end of the shaft 42 projects beyond the upper bearing 74 sufficiently to carry a ball or bead chain drive sprocket wheel or pulley 76 which is suitably and rigidly secured to the shaft 42 as by silver soldering or keying.

The wheel 76 is arranged to drivingly connect with a driven sprocket wheel or pulley 78 through suitable belt or chain means generally designated by the numeral 80 and which preferably is a bead chain of conventional structure comprising a plurality of spaced beads or balls 82 having swivel bar connectors 84. The wheels 76, 78 may be suitably peripherally grooved to provide guide or belt retaining grooves 86 and will preferably be provided, where a ball chain is used, with sockets 88 for receiving the beads or balls 82 to provide a positive non-slip drive. One end of the chain 80 is, as seen in FIGURE 6, secured to the wheel 76 by a radially directed clamp screw 90 received in a threaded hole 92 in the wheel 76 located at an angle of about 35 degrees upwardly and to the right of the vertical in FIGURE 6. A second similar threaded radial hole 94 is provided on the wheel 76 at an angle of 35 degrees downwardly and to the right of the vertical in FIGURE 6 for a purpose hereinafter described. As shown one endmost bead of the chain 80 is carried in a socket 96 of a preformed metal sling generally designated by the numeral 98 the wings 100, 102 of which are brought together and held against the pulley by the screw 90 as seen in FIGURE 6. The other endmost bead of the chain 80 is similarly held by a second sling 104 and clamp screw 106 to a cylindrical weight 108 having a clearance relationship with the cylindrical wall 110 of the vertical tube 32 in which it is slidable. The weight 108 serves as a gravity return device for the arm 40 providing resistance during movement of the arm 40 by the vehicle away from the stop 62 and returning the arm 40 against the stop 62 when the vehicle has moved clear of the arm.

The driven wheel 78 which has a rearwardly extending hub portion 111 is rotatably carried on a stationary shaft or rod 112 of uniform size extending transversely of the body member 36 and normal to a vertical plane through the median line 66 and arm 40 when the latter is against the stop 62. The shaft 112 is supported by oppositely spaced upright bosses or bearing bracket portions 114, 116 of the body member 36 and held in transverse bores 118 therein by a set screw 120.

Intermediate the transversely positioned bearing brackets 114, 116 are a pair of longitudinally spaced apart upstanding support bosses 122, 124 which are located centrally on the vertical plane through the median line 66. These bosses mount by screws 126 a control device generally referred to by the numeral 130 which in the embodiment in FIGURES 6 and 7 is for purposes of illustration only shown as a switch mechanism. For reasons to be explained the right hand boss 124 supporting the mechanism 130 is so arranged intermediate the bearing brackets 114, 116 that the distances between their inner mutually facing sides are substantially equidistant. The overall length of the wheel 78 with its hub 111 is such as to fit with small clearance the space between the bosses 116 and 124. If desired, this clearance may accommodate loose end bearing washers such as the washer 132 on one or both sides of the wheel 78.

The boss 116 is so positioned that a vertical plane through the chain 80 lengthwise of the section between the wheels 76, 78 will split the groove face of the wheel 78 and be tangent to the wheel 76 and that a horizontal plane through this chain section will split the groove face of the wheel 76 and be tangent to the wheel 78. In this manner the chain 80 can lie smoothly over the wheel 78 and extend downwardly centrally into the tube 32 through an opening 134 in the body member 36 and connect with the weight 108 in the space 136 therein.

It will be noted that for the purposes of this invention and since the chain 80 is rigidly connected to the wheel 76 that the drive sockets 88 for the chain beads may if desired be omitted from the wheel 76. It will also be noted that the drive connection between the wheels 76, 78 is such that slack may be developed in the chain for example, by a sudden reverse rotation (opposite to the arrow 138 in FIGURE 6) of the arm 40 independently of weight 108 without detracking the chain from the wheel 78.

As shown in FIGURE 4 the tubes 32 and 34 are each closed at their lower ends as by plugs or discs 140 and tube 32 is partially filled with a fluid 142 in which the weight 108 operates. Moreover, each tube is provided with a lower threaded drain port 144, that on the tube 32 being closed by a threaded plug 146. The drain port 144 provides a means for controlling the level of the fluid in the tube 32. It will be understood that a suitable draincock may replace the plug 146 if desired for this purpose.

It is preferred that the weight 108 be partially immersed in the fluid 142 when the arm 40 has been moved to its extreme position in the direction of the arrow 138 by the vehicle 14 and the weight is in its farthest upward position as at 148 in FIGURE 4. With this arrangement the fluid 142 will be able to immediately exert its buoyant or cushioning effect upon the weight 108 when the vehicle 14 has passed by the arm 40 and the weight 108 desires to return the arm 40 to its position against the stop 62. It will be understood that when a quick return action is required for the arm 40 over part or nearly all of its return swing that the weight 108 may be entirely out of the fluid and delayed in entering the same depending upon the return action and cushioning desired. In any event the fluid will serve to dampen the movement of the weight and prevent an oscillating movement of the arm 40 and the intervening switch operating member when the arm 40 is returned against the stop 62. The action of the weight in the fluid will also obviously depend upon the mass of the weight 108, the clearance between it and the wall 110 of the tube 32 past which the fluid must flow in the downward movement of the weight and the character or viscosity of the fluid in the tube 32. In one operation using a tube of 1⅛ inches internal diameter, satisfactory action was obtained with a weight ⅞ of an inch in diameter operating in a column of oil. If desired the weight may be a sliding fit in the tube 32 and be provided with a fluid escape passage extending between its ends the size of which at either end may be controlled by an adjustable valve or port. The latter construction is normally not recommended since freedom of movement of the weight without sticking is desired in the tube at all times and regardless of the plumb of the weight in the tube.

The actuator device of this invention is preferably operable under all weather and temperature conditions. It is therefore preferred that the fluid 142 be one having non-corrosive and low temperature freezing properties. An oil or glycol type antifreeze fluid is best in this regard since it permits functioning of the device over wide changes in ambient temperature without substantial change in viscosity of the fluid.

The control mechanism 130 to be acted upon by the actuator device is as described above illustrated as shown in FIGURES 6 and 7 in the form of a switch mechanism schematically depicted in FIGURE 9. This switch mechanism may comprise a body block 160 and cover 162 preferably of electrical insulation material both secured by screws 126 to the bosses 122, 124 of the body member 36, contained within the block is a pair of contact members 164, 166, a contact making means generally designated by the numeral 168 comprising a plunger 170 of insulation material bearing in the cover 162 and the outer end 171 of a housing or bracket 172 carried by the cover 162. The plunger 170 has a disc-like portion 174 intermediate its end that constantly bears against a compression spring 176 operatively positioned between this portion 174 and the bracket end 171. The plunger 170 also has an operating head 178 at its end outwardly of the cover 162 and a resilient contact making element 180 which is adapted to bridge and complete an electric circuit between the contacts 164, 166. Terminal screws 182, 184 connect leads 186, 188 to the switch block and these leads then pass down the tube 34 and out the port 144 which may if desired be provided with a conventional electrical conduit fitting (not shown) to connect for example with one side of a power supply 190 and the solenoid 192 of a relay 194 controlling a switch 196 for controlling one or more of the brush motors, spray valve solenoid and like devices of the wash line. Normally the spring 176 maintains the switch plunger outwardly with the disc portion 174 against the cover 172 and with the bridging element 180 displaced from the contact elements 164, 166 open circuiting the same.

For actuating the contact making means 168 an actuator member generally designated by the numeral 200 is provided comprising a hub portion 202 carried on the hub 111 of the driven chain wheel 78 and secured thereto by a set screw 204. Radially outwardly and extending rearwardly of the hub portion 202 is an actuating finger 206 having a portion 208 which overlies the head 178 of the switch operating means 168 on the median line 66. A feature of the construction of the member 200 is that either side of the portion 208 may be presented to the head 178 of the switch for operating the same. As shown, the finger 206 is biased against the switch operating means 168 by action of the weight 108 thereby causing operation of the switch to close the circuit between contacts 164 166 and actuating the relay 194 to open the switch 196 to deenergize the devices of the wash line controlled thereby. Moreover, the spring 176 is then compressed. When the operating arm 40 of the actuator device is swung in the direction of the arrow 138 in FIGURE 6 the chain drive will rotate the finger 206 away from the switch operating means 168 permitting the spring 176 to move the plunger 170 outwardly and open the circuit between contacts 164, 166 thereby deenergizing the relay 194 and closing the switch 196 to energize the car wash line devices.

It will be understood that the switch mechanism shown may take many other known forms and that the circuitry may also be modified at will to produce the desired control. Moreover as previously pointed out the actuator device of my invention may act upon a hydraulic control means for example a valve or the like of a hydraulic system controlling the several devices of the car wash line. Thus as seen schematically for example, in FIGURE 10 of the drawings, the actuating finger 200 may be made to operate the head 178 of a piston 210 of a valve generally designated by the numeral 212. The valve may comprise a body structure 213 having opposite ports 214, 216 which are normally open as permitted by the cylindrical land 218 of the piston when the piston is in the position shown to which it has been actuated by the weight 108 and finger 200, the arm 40 of the actuator device being then against its stop 62. In this position of the piston the land 218 is axially spaced from the transverse wall 220 of the valve body 213 so that fluid flow can take place between the ports 214, 216 to prevent operation of the car wash line devices. A spring 222 acts between this land 218 and an adjustable collar 226 on the piston to oppose bias of the finger 200. When the arm 40 is moved in the direction of the arrow 138 to cause the finger 200 to move away from the head 178 of the piston, the spring 222 then moves the land 218 of the piston over the ports 214, 216 to close the same and permit actuation of the car wash line devices. A cross hole or passage 228 is provided in the piston land to facilitate operation of the piston by the means 200.

In operation of the actuator device 10 as arranged in FIGURES 1 and 2, at the left side of the vehicle 14 about to enter the brush and spray unit 12, the actuator device mechanism will be in the condition shown in FIGURES 1 to 8 with the arm 40 extending normal to the path of movement of the vehicle and being held there and against the stop 62 by action of the weight 108 transmitted through the chain and sprocket drive. As the vehicle 14 is propelled into the unit 12 it strikes the stem 50 of the operating arm 40 causing it to move away from the stop 62 thus rotating the drive wheel 76 counterclockwise in FIGURE 6 and through the chain 80 and driven wheel 78 rotating the actuator member 200 clockwise in FIGURE 7 permitting this member to release the depressed switch operating means 168 and allow the switch to open circuit and effect operation of the motors 26 and the water spray solenoid valve 28 of the unit 12 as described above. Rotation of the arm 40 to the full line position in FIGURE 2 will also cause the weight 108 to rise partially out of the fluid 142 in the tube 32 to the position indicated in phantom at 148 in FIGURE 4. The arm 40 will cam along the vehicle body as the latter passes through the unit 12 and has the rinsing and brushing operation performed upon it, the angle of movement of the arm 40 being adequate to effect an operation of the control mechanism 130 and maintain the same in the condition thus produced as long as the arm 40 maintains contact with the vehicle body. Upon leaving the vehicle body the arm 40 which is constantly under bias of the weight 108 will be returned to its position against the stop pin 62 and the control mechanism 130 will be reestablished in its normal condition by action of actuating member 200 upon the operating means 168 of the control mechanism as described above. The weight 108 cannot freely fall in the tube 32 as it returns the arm 40 to its normal position but is subject to the buoyant action of the fluid some of which it must displace upwardly in the tube around and over itself in the descent. Thus the return of weight 108 and the entire actuator mechanism including arm 40 is cushioned or retarded by action of the fluid and any hunting of the arm 40 and actuating member 200 is inhibited. Since the actuating member 200 biases the operating means 168 at this time against a constant spring force 196 or 222 it will be apparent that there will also be no hunting in the control mechanism 130.

It is sometimes desirable or necessary to position the actuator device in some other location relative to the vehicle, for example in the position A shown in phantom in FIGURE 2 at the right side of the vehicle. It is also a feature of the actuator device of the present invention to make this modification of positioning and operation possible by a mere simple rearrangement of parts and without changing the number of parts involved in the mechanism or requiring any substitution of parts. Thus to effect a change of the actuator device to the position A the plug 146 and fluid 142 in tube 32 will be transferred to tube 34; the leads 186, 188 will be threaded down through tube 32 instead of the tube 34; the stop pin 62 will be transferred to the hole 64 on the opposite side of the arm 40 in FIGURE 6; the shaft 112 with its driven pulley 78 and actuating member 200 will be inverted such that the pulley 78 is adjacent the boss 114 instead of the boss 116 of the body member 36; the chain 80 will suspend the weight 108 in the tube 34 instead of tube 32; the finger 206 of the actuating member 200 will overlie the operating means of the switch mechanism 130 as before but with the hub of the member 200 facing in the opposite direction; and with the chain 80 secured to the pulley 76 at the threaded mounting hole 94 instead of the hole 92 as shown.

In order to provide for adjustment of the length of the stem 50 of the operating arm 40 to accommodate vehicles of varying width and to adjust the angle of operation of the arm 40, the stem 50 may in any well known manner be composed of two or more telescoping sections and which sections may if desired become locked in position when fully extended. This feature is also advantageous in providing a means of collapsing the arm 40 when not in use and in shipping to prevent damage to the arm or actuating mechanism.

From the foregoing description of my invention it will be apparent that I have provided a unique actuator device and mechanism operable upon the control means for one or more units of a car wash line and that will be free of the hunting disabilities and other objections described above with respect to known devices. It will be apparent that various modifications and changes may be made in the apparatus of my invention as disclosed in the drawings and described above by those skilled in the art without departing from the spirit and intent of my invention. Accordingly, all such changes and modifications as may come within the scope of the appended claims and all equivalents are contemplated.

I claim:

1. An actuator mechanism for automatic car wash lines for effecting actuation of control means for one or more car treating elements thereof, comprising an actuating member in juxtaposition to said control means movable for effecting an actuation of said control means from a first to a second control condition, an operating member for said actuating member operable when engaged by movable means having relative motion with respect to this operating member for effecting an operation of said actuating member to establish said control means in said second condition, a second operating member movably operable upon disengagement of said first mentioned operating member from said movable means for effecting an operation of said actuating member independently of said first mentioned operating member for reestablishing said control means in said first control condition, and motion transmitting means drivingly interconnecting said operating members with each other and each of said operating members with said actuating member.

2. An actuator mechanism for an automatic car wash line for effecting actuation of control means for one or more car treating elements thereof, comprising an actuating member engageable with said control means and movable for actuating said control means from an inoperable to an operable condition, a car operable operating member movably operable in response to engagement thereof by a car in moving along said wash line for effecting said movement of said actuating member to establish said control means in said operable condition, a second operating member movably operable upon disengagement of said first mentioned operating member from said moving car for effecting movement of said actuating member independently of said first mentioned operating member for reestablishing said control means in its said inoperable condition, and motion transmitting means including a plurality of rotatable wheels and a chain engaged with said wheels drivingly interconnecting said operating members with each other and at least one of said operating members with said actuating member.

3. An actuator mechanism for automatic car wash lines for effecting actuation of control means for one or more car treating elements thereof, comprising a pivotally mounted actuating member engageable with said control means and movable for actuating said control means from a first to a second control condition, a pivotally mounted car operable operating member movably operable in response to engagement thereof by a car moving relative thereto for effecting said movement of said actuating member to establish said control means in said second control condition, a gravity operable operating member movably operable upon disengagement of said first mentioned operating member from said car for effecting movement of said actuating member independently of said car operable operating member for reestablishing said control means in said first control condition, and motion transmitting means including a chain belt drivingly interconnecting said operating members with each other and each of said operating members with said actuating member.

4. An actuator mechanism for automatic car wash lines for effecting actuation of control means for one or more car treating elements thereof, comprising a pivotally mounted actuating member engageable with said control means and movable for actuating said control means from a first to a second control condition, a pivotally mounted car operable operating member movably operable in response to engagement thereof by a car moving relative thereto for effecting said movement of said actuating member to establish said control means in said second control condition, a gravity operable operating member movably operable upon disengagement of said first mentioned operating member from said car for effecting movement of said actuating member independently of said car operable operating member for reestablishing said control means in said first control condition, motion transmitting means including a chain belt drivingly interconnecting said operating members with each other and each of said operating members with said actuating member, and a hollow vessel surrounding said gravity operable operating member for receiving a fluid in which to suspend this last mentioned operating member.

5. An actuator mechanism for automatic car wash lines for effecting actuation of control means for one or more car treating elements thereof, comprising a pivotally mounted actuating member engageable with said control means and movable for actuating said control means for effecting establishment thereof in a second control condition from a first control condition thereof, an elongated car operable operating arm swingably mounted for operation in a generally horizontal plane and movably operable in response to engagement thereof by a car moving relative thereto for effecting said movement of said actuating member to establish said control means in said second control condition, stop means adjacent said operating arm serving as a stop therefor when said arm is disengaged from said car and is in its position corresponding to said first control condition of said control means, a weight for releasably holding said arm against said stop means, motion transmitting means drivingly connecting said arm with said weight and with said actuating member whereby said weight and actuating member are movably responsive to swinging movement of said arm away from said stop means by a car to be treated, and a fluid chamber in which to suspend said weight including fluid means in said chamber for acting upon said weight to retard return movement of said arm to said stop means upon said arm becoming disengaged from said car.

6. An actuator mechanism for automatic car wash lines for effecting actuation of control means for one or more car treating elements thereof, comprising a rotatably mounted actuating member having an operating portion operable between first and second positions upon rotation of said member to effect an operation of said control means to establish a first control condition in said control means and operable for effecting an operation of said control means to establish a second control condition in said control means upon operation of said operating portion from said second to said first position, a rotatable chain driven wheel for rotating said actuating member, a rotatable chain drive wheel, a drive chain drivingly connecting said wheels, one end of said chain being secured to said drive wheel and the other end of said chain having a weight suspended therefrom and maintaining said chain in driving engagement with said driven wheel, and a car operable arm mounted for rotation with said drive wheel, said arm being operable when engaged by a car moving relative thereto from a first position corresponding substantially to said first position of said operating portion of said actuating member and said second control condition of said control means, to a second position corresponding substantially to said second position of said operating portion of said actuating member and said first control condition of said control means and said arm being rotatable through said weight and chain back to its said first position for effecting return of said operating portion of said actuating member to its said first position from its said second position to thereby effect reestablishment of said control means in said second control condition.

7. An actuator mechanism as claimed in claim 6 including a stop for said car operable arm in its said first position and against which it is biased by said weight and means operable upon said chain drive for controlling the rate of return of said operating portion of said actuating member to its said first position whereby to inhibit hunting action in said control means.

8. An actuator mechanism for automatic car wash lines for effecting actuation of control means for one or more car treating elements thereof, comprising a rotatably mounted actuating member having an operating portion in operable relation to said control means and rotatably operable between first and second positions upon rotation of said member, said operating portion in said first and second positions respectively effecting establishment of first and second control conditions respectively in said control means, a rotatable chain driven wheel for rotating said actuating member, a rotatable chain driving wheel, a drive chain drivingly connecting said wheels, one end of said chain being secured to said driving wheel and the other end of said chain having a weight suspended therefrom and maintaining said chain in driving engagement with said driven wheel, a car operable arm mounted for rotation with said driving wheel, said arm being operable when engaged by a car moving relative thereto from a first position corresponding substantially to said first position of said operating portion of said actuating member and said first control condition of said control means to a second position corresponding substantially to said second position of said operating portion of said actuating member and said second control condition of said control means and said arm being rotatable by said weight back to said first position for effecting return of said operating portion of said actuating member to its said first position from its said second position to thereby effect reestablishment of said control means in said first control condition, a stop for said arm in its said first position and against which it is biased by said weight and means operable upon said weight for controlling the rate of return of said actuating member to its said first position whereby to inhibit hunting in said control means.

9. An actuator mechanism for automatic car wash lines for effecting actuation of control means for one or more car treating elements thereof, comprising an actuating member arranged in operable relation to said control means and rotatably operable between first and second positions for effecting an operation of said control means, said member in one of said first and second positions establishing a first control condition in said control means and in the other of said first and second positions facilitating establishment of a second control condition in said control means, a rotatable chain driven wheel in driving relation with said actuating member and operable to rotate said actuating member, a rotatable chain drive wheel, a drive chain in driving engagement with said wheels, one end of said chain being secured to said drive wheel and the other end of said chain having a weight suspended therefrom, a car operable arm mounted for rotation with said drive wheel, said arm when engaged by movable means having relative motion with respect thereto being operable from a first position corresponding substantially to said first position of said actuating member and said first control condition of said control means to a second position corresponding substantially to said second position of said actuating member and said second control condition of said control means and said arm being rotatable by said weight back to said first position upon disengagement of said arm from said movable means for effecting return of said actuating member to its said first position from its said second position to thereby effect reestablishment of said control means in said first control condition, a stop for said arm in its said first position and against which it is biased by action of said weight and a fluid receptacle in which said weight is suspended by said chain and in which it may rise and fall coincidently with rotation of said arm.

10. An actuator mechanism as claimed in claim 9 including a substantially non-corrosive fluid of low temperature freezing properties in said receptacle for receiving said weight.

11. An actuator mechanism for automatic car wash lines for effecting actuation of control means for one or more car treating elements thereof comprising a base member, a body member, a pair of spaced apart parallel upstanding tubular elements secured to said base member and supporting said body member, said tubular elements being closed at their lower ends and open at their upper ends, a pair of openings in said body member connecting with the upper open ends of said tubular elements, control means secured to said body member, an actuating member positioned for operation upon said control means and rotatably mounted on said body member for rotation about a substantially horizontal axis generally paralleling a plane through the axes of said tubular elements, a chain driven wheel mounted for rotation with said actuating member, said driven wheel having its peripheral face overlying one of said body openings, a rotatable chain drive wheel mounted on said body member for rotation about a generally vertical axis, said drive wheel being positioned relative to said driven wheel such that a line tangent to a peripheral face portion of said drive wheel is also substantially tangent to a peripheral face portion of said driven wheel, a drive chain in driving engagement with said wheels, one end of said chain being secured to the peripheral face of said drive wheel and the other end of said chain extending down from the peripheral face of said driven wheel through said one body opening and into the tubular element having its open end connecting with this body opening, a weight suspended in this tubular element by said chain, an arm mounted for rotation with said chain drive wheel and extending outwardly of said body member and a stop member for said arm mounted on said body member.

12. An actuator mechanism as claimed in claim 11 including a dished cover secured on said body member and forming a chamber therewith.

13. An actuator mechanism as claimed in claim 11 wherein said drive wheel has a pair of optional mounting positions for said chain; wherein said body member has a pair of optional mounting positions for said stop member, one on each side of said arm; and wherein said actuating member and driven wheel are positionable with the actuating member in position for operation upon said control means when said driven wheel has its peripheral face overlying either of said body openings such that the control means may be made responsive to operation of said arm when the latter is positioned on either side of a car.

14. An actuator mechanism as claimed in claim 11 wherein said tubular elements have a fluid drain opening adjacent the base member thereof and plug means engaged in said opening.

15. An actuator mechanism as claimed in claim 14 wherein said control means is a switch having an outwardly biased operating element engageable by said actuating member and circuit leads connecting with said switch and extending downwardly through said other tubular element and out said drain opening therein adjacent the base member thereof.

16. An actuator mechanism as claimed in claim 11 wherein said control means is a valve including a piston operating element engageable by said actuating member.

17. An actuator mechanism as claimed in claim 11 wherein said arm is composed of fibre glass.

18. An actuator mechanism as claimed in claim 11 wherein said arm is composed of a plurality of adjustable telescoping sections.

19. An actuator mechanism for operating control means for one or more car treating elements of an automatic car wash line, said control means having an outwardly biased operating element depressible to a position establishing said control means in a second control condition from a first control condition thereof, a support for said control means, an actuating member for said operating element rotatably mounted on said support and having a portion overlapping said operating element, a weighted operating element, driving means drivingly connecting said weighted operating element with said actuating member and normally actuating the latter to actuate said first mentioned operating element to its depressed position to establish said control means in said second control condition, an operating arm pivotally mounted on said support, driving means drivingly connecting said operating arm with said actuating member, said arm being normally positioned to project into a car wash line so as to be engaged by a car moving along said line and be swung to a position where it becomes disengaged from said car, and said arm during said swinging movement thereof by said car operating said actuating member to release said first mentioned operating element from its depressed position to reestablish said control means in said first control condition, and driving means drivingly connecting said weighted operating element and said operating arm connected with each other, each of said driving means having a portion common to the other of said driving means References Cited by the Examiner
UNITED STATES PATENTS
2,610,342   9/1952   Griffiths _____ 200—61.41

KATHLEEN H. CLAFFY, *Primary Examiner.*
BERNARD A. GILHEANY, *Examiner.*